US009939290B1

(12) United States Patent
Rout et al.

(10) Patent No.: US 9,939,290 B1
(45) Date of Patent: Apr. 10, 2018

(54) METHOD FOR CALIBRATION OF A SYSTEM WITH TIME-MULTIPLEXED SENSORS

(71) Applicant: PANASONIC CORPORATION, Osaka (JP)

(72) Inventors: Saroj J. Rout, Nashua, NH (US); Akhil K. Garlapati, Lexington, MA (US); Qicheng Yu, Lexington, MA (US)

(73) Assignee: PANASONIC CORPORATION, Osaka (JP)

( * ) Notice: Subject to any disclaimer, the term of this patent is extended or adjusted under 35 U.S.C. 154(b) by 120 days.

(21) Appl. No.: 14/685,139

(22) Filed: Apr. 13, 2015

Related U.S. Application Data

(63) Continuation-in-part of application No. 14/487,827, filed on Sep. 16, 2014, now Pat. No. 9,699,534.

(60) Provisional application No. 61/878,106, filed on Sep. 16, 2013, provisional application No. 61/978,276, filed on Apr. 11, 2014.

(51) Int. Cl.
*G01P 21/00* (2006.01)
*G01P 15/14* (2013.01)
*G01D 3/032* (2006.01)

(52) U.S. Cl.
CPC ............ *G01D 3/032* (2013.01); *G01P 15/14* (2013.01); *G01P 21/00* (2013.01)

(58) Field of Classification Search
CPC ......... G01P 15/14; G01P 21/00; G01D 3/021; G01V 13/00
See application file for complete search history.

(56) References Cited

U.S. PATENT DOCUMENTS

| | | | | |
|---|---|---|---|---|
| 5,723,786 A * | 3/1998 | Klapman | ................ | G01P 15/18 482/84 |
| 5,831,167 A * | 11/1998 | Andersen | ............. | G01N 29/022 73/602 |
| 5,908,986 A * | 6/1999 | Mitamura | .......... | G01C 19/5719 73/504.12 |
| 6,023,960 A * | 2/2000 | Abrams | .................. | G01P 21/00 73/1.01 |
| 6,035,694 A * | 3/2000 | Dupuie | ................. | G01P 15/125 73/1.38 |
| 6,577,975 B2 * | 6/2003 | Chiesa | ................... | G01D 3/066 310/40 MM |
| 6,758,080 B1 * | 7/2004 | Ragan | .................... | G01V 13/00 73/1.38 |
| 6,891,621 B2 * | 5/2005 | Berg | ...................... | G01V 1/184 356/477 |
| 7,114,366 B1 * | 10/2006 | Jones | ..................... | G01P 15/125 73/1.01 |
| 8,136,383 B2 * | 3/2012 | Goujon | .................. | G01V 13/00 702/104 |
| 8,232,813 B2 * | 7/2012 | Burdett | ................ | G01N 27/404 324/713 |
| 8,816,703 B2 * | 8/2014 | Balachandran | ..... | G01P 15/0802 324/679 |
| 9,116,166 B2 * | 8/2015 | Balachandran | ......... | G01L 25/00 |
| 9,329,042 B1 * | 5/2016 | Cazzaniga | ......... | G01C 19/5776 |

(Continued)

*Primary Examiner* — Helen Kwok
(74) *Attorney, Agent, or Firm* — McDermott Will & Emery LLP

(57) ABSTRACT

A sense channel signal processing block is time-domain multiplexed among multiple MEMS devices and utilizes an anti-aliasing filter disposed after track-and-hold switches, to prevent the bandwidth of the sense channel from being limited by the anti-aliasing filter. A multiplexed signal processor architecture performs dynamic calibration of all sensor error signals in response to environmental changes.

5 Claims, 4 Drawing Sheets

(56) References Cited

U.S. PATENT DOCUMENTS

| | | | |
|---|---|---|---|
| 2005/0005712 A1* | 1/2005 | Gysling | G01F 1/7082 |
| | | | 73/861.23 |
| 2005/0172715 A1* | 8/2005 | Babala | B60R 21/0132 |
| | | | 73/504.16 |
| 2006/0162454 A1* | 7/2006 | Manninen | G01P 15/125 |
| | | | 73/514.32 |
| 2008/0202237 A1* | 8/2008 | Hammerschmidt | G01C 19/5719 |
| | | | 73/504.04 |
| 2009/0007661 A1* | 1/2009 | Nasiri | G01P 1/023 |
| | | | 73/504.03 |
| 2009/0022009 A1* | 1/2009 | Ozdemir | G01V 1/364 |
| | | | 367/21 |
| 2012/0240679 A1* | 9/2012 | Netzer | G01P 15/125 |
| | | | 73/514.32 |
| 2012/0272733 A1* | 11/2012 | Ronen | G01C 19/5755 |
| | | | 73/504.12 |
| 2013/0031950 A1* | 2/2013 | Donadel | G01C 19/5776 |
| | | | 73/1.77 |
| 2013/0125614 A1* | 5/2013 | Casinovi | G01C 19/5776 |
| | | | 73/1.77 |
| 2014/0260508 A1* | 9/2014 | Dar | G01P 21/00 |
| | | | 73/1.01 |
| 2014/0352400 A1* | 12/2014 | Barrilado | B81B 7/008 |
| | | | 73/1.38 |
| 2015/0285057 A1* | 10/2015 | Donderici | E21B 47/102 |
| | | | 73/152.54 |
| 2015/0362362 A1* | 12/2015 | Pan | G01H 11/06 |
| | | | 73/645 |
| 2016/0139174 A1* | 5/2016 | Cozac | G01P 21/00 |
| | | | 73/1.37 |

* cited by examiner

METHOD FOR CALIBRATION OF A SYSTEM WITH TIME-MULTIPLEXED SENSORS

RELATED APPLICATIONS

This application is a continuation in part of U.S. patent application Ser. No. 14/487,827 filed on Sep. 16, 2014, entitled TIME-DOMAIN MULTIPLEXED SIGNAL PROCESSING BLOCK AND METHOD FOR USE WITH MULTIPLE MEMS DEVICES, the entire subject matter of which is incorporated herein by this reference for all purposes.

This application further claims priority to U.S. Provisional Patent Application Ser. No. 61/978,276, Filed Apr. 11, 2014, entitled A CALIBRATION TECHNIQUE BASED ON FINDING A MINIMA FOR SYSTEMS WITH TIME-MULTIPLEXED SENSORS, the entire subject matter of which is incorporated herein by this reference for all purposes.

FIELD OF THE INVENTION

The disclosure relates to Microelectromechanical Systems (MEMS) devices, and, more specifically, to a system and technique for calibration of a system with time-multiplexed sensors.

BACKGROUND OF THE INVENTION

Inertial measurement devices, such as gyroscopes and accelerometers, provide high-precision sensing, however, historically, their cost, size, and power requirements have prevented their widespread use in industries such as consumer products, gaming devices, automobiles, and handheld positioning systems. More recently, micro-electro-mechanical systems (MEMS) device implementations of gyroscopes and accelerometers have been gaining increased attention from multiple industries since micro-machining technologies have made fabrication of miniature gyroscopes and accelerometers possible. Miniaturization also enables integration of multiple MEMS devices with readout electronics on the same die, resulting in reduced size, cost, and power consumption as well as improved resolution by reducing noise.

Current integrated circuit component implementations of a MEMS system containing multiple inertial measurement devices use separate analog signal processing blocks for each unique MEMS device, such signal processing blocks, typically include a trans-impedance amplifier (TIA), programmable gain amplifier (PGA), zero-IF mixer (ZIF Mixer), and a rate amplifier (Rate-Amp), collectively usually referred to as "sense channel", for each MEMS device in the MEMS system. Such designs include multiple occurrences of identical components and add to the space, expense and fabrication complexity of the MEMS system.

Accordingly, a need exists for a more efficient signal processing architecture for a system having multiple MEMS devices which eliminates the redundancy of multiple occurrences of identical components.

Further, sensor outputs drift with changes in the external conditions such as temperature, stress, humidity, etc. These undesired effects cannot be corrected using a single factory calibration since environmental changes can be drastic during the normal operation of a device. As such, dynamic calibration of sensor signal errors is critical for sensors that are susceptible to environmental stresses that change over time.

Accordingly, a need exists for a multiplexed signal processor architecture to perform dynamic calibration of all sensor error signals such that the undesired effects are reduced to meet the application requirements.

SUMMARY OF THE INVENTION

Disclosed is an architecture comprising a common signal processing block shared among multiple MEMS devices in time-domain multiplexed manner. In the disclosed implementation, multiple instances of MEMS gyroscopes are used with a single signal processing block, e.g. a single sense channel, which is multiplexed in time-domain to be shared among the multiple MEMS devices. By moving the 'anti-aliasing' filter after the track-and-hold switches, as described herein, a single analog processing block may be shared among multiple MEMS devices in a multiplexed manner serving as the sense channel for each device.

Also disclosed is a technique utilizes a multiplexed signal processor architecture to perform dynamic calibration of all sensor error signals. Using the disclosed methods, the sensor dynamically adjusts its state in response to environmental changes such that the undesired effects are reduced to meet the application requirements. In some sensor systems the drift has distinct minima over the allowable range of variation. If a signal processing unit is being shared among multiple sensors using a time-multiplexed architecture, the proposed technique can be used to correct the sensor drift such that the state of the sensor is maintained at the minima.

According to one aspect of the disclosure, a method of calibrating multiple MEMS devices in a multiplexed, time domain manner comprises: A) processing an output signal from each of a plurality of MEMS devices with a common signal processing module; B) deriving a calibration signal from the output signal of each of the plurality of MEMS devices; and C) providing a corresponding derived calibration signal to each of the plurality of MEMS devices in a multiplexed, time domain manner. In one embodiment B) comprises B1) at least partially deriving a parameter signal from an output signal of each of a plurality of MEMS devices, and B2) generating a calibration signal from a parameter signal corresponding to each of the plurality of MEMS devices. In another embodiment, A) comprises A1) processing an output signal from a first of the plurality of MEMS devices with the common signal processing module during a first time segment, A2) processing an output signal from a second of the plurality of MEMS devices with the common signal processing module during a second time segment different from the first time segment. In still other embodiments, C) comprises C1) providing a corresponding derived calibration signal to a first of the plurality of MEMS devices during a first time segment, and C2) providing a corresponding derived calibration signal to a second of the plurality of MEMS devices during a second time segment different from the first time segment.

According to another aspect of the disclosure, a system for calibrating multiple MEMS devices comprises: a common signal processing module configured for processing, in a multiplexed, time domain manner, an output signal from each of a plurality of MEMS devices; a calibration module configured to generate a calibration signal at least partially derived from a processed output signal associated with one of the plurality of MEMS devices and further configured to provide the generated calibration signal to one of the plurality of MEMS devices in a multiplexed, time domain manner. In one embodiment, the common signal processing module is further configured for generating a parameter signal at least partially derived from the output signal of one of the plurality of MEMS devices. In another embodiment, the calibration module is configured to generate a calibration signal from a processed output signal associated with one of the plurality of MEMS devices. In yet another embodiment, th4e system further comprises a timing generator module for providing timing signals to the common signal processing module and the calibration module.

According to still another aspect of the invention, a sense channel apparatus comprises: a) a plurality of input switches for receiving an analog signal from a MEMS device; b) a zero-IF mixer operatively coupled intermediate plurality of input switches and an input of a rate amplifier; c) a plurality of rate amplifier switches, each having an input section coupled to an output of the rate amplifier; and d) a common signal processing module operatively coupled intermediate the zero-IF mixer and the input section of a plurality of rate amplifier switches, the signal processing module configured to at least partially derive a parameter signal from an analog signal from a MEMS device; and e) a calibration module configured to generate a calibration signal at least partially derived from a parameter signal associated with one of the plurality of MEMS devices and further configured to provide the generated calibration signal to one of the plurality of MEMS devices in a multiplexed, time domain manner

BRIEF DESCRIPTION OF THE DRAWINGS

Embodiments of the disclosed subject matter are described in detail below with reference to the following drawings in which.

DETAILED DESCRIPTION

The present disclosure will be more completely understood through the following description, which should be read in conjunction with the drawings. The skilled artisan will readily appreciate that the methods, apparatus and systems described herein are merely exemplary and that variations can be made without departing from the spirit and scope of the disclosure.

MEMS devices, such as those disclosed in U.S. Pat. Nos. 7,578,189; 7,892,876; 8,173,470; 8,372,67; 8,528,404; 7,543,496; and 8,166,816, are able to sense rotational (i.e. angle or angular velocity of rotation around an axis) or translational motion (i.e. linear acceleration along an axis) around and along axes. The sense channel disclosed herein may be used with MEMS systems directed towards sensing rotation and acceleration around all three axes of free space using multiple inertial measurement MEMS devices. Such devices may have six degrees of freedom in their mechanical design to be able to sense six independent motion signals, i.e. linear acceleration along and angular velocity signals around three orthogonal axes of free space. The apparatus and techniques disclosed herein may be used with any number of commercially available MEMS gyroscopes including those disclosed in U.S. Pat. No. 7,023,065 United States Patent Application Publication 2012/0227,487, and United States Patent Application Publication 2012/0227, 487, the subject matter of which are incorporated herein by this reference for all purposes.

Figure 1:
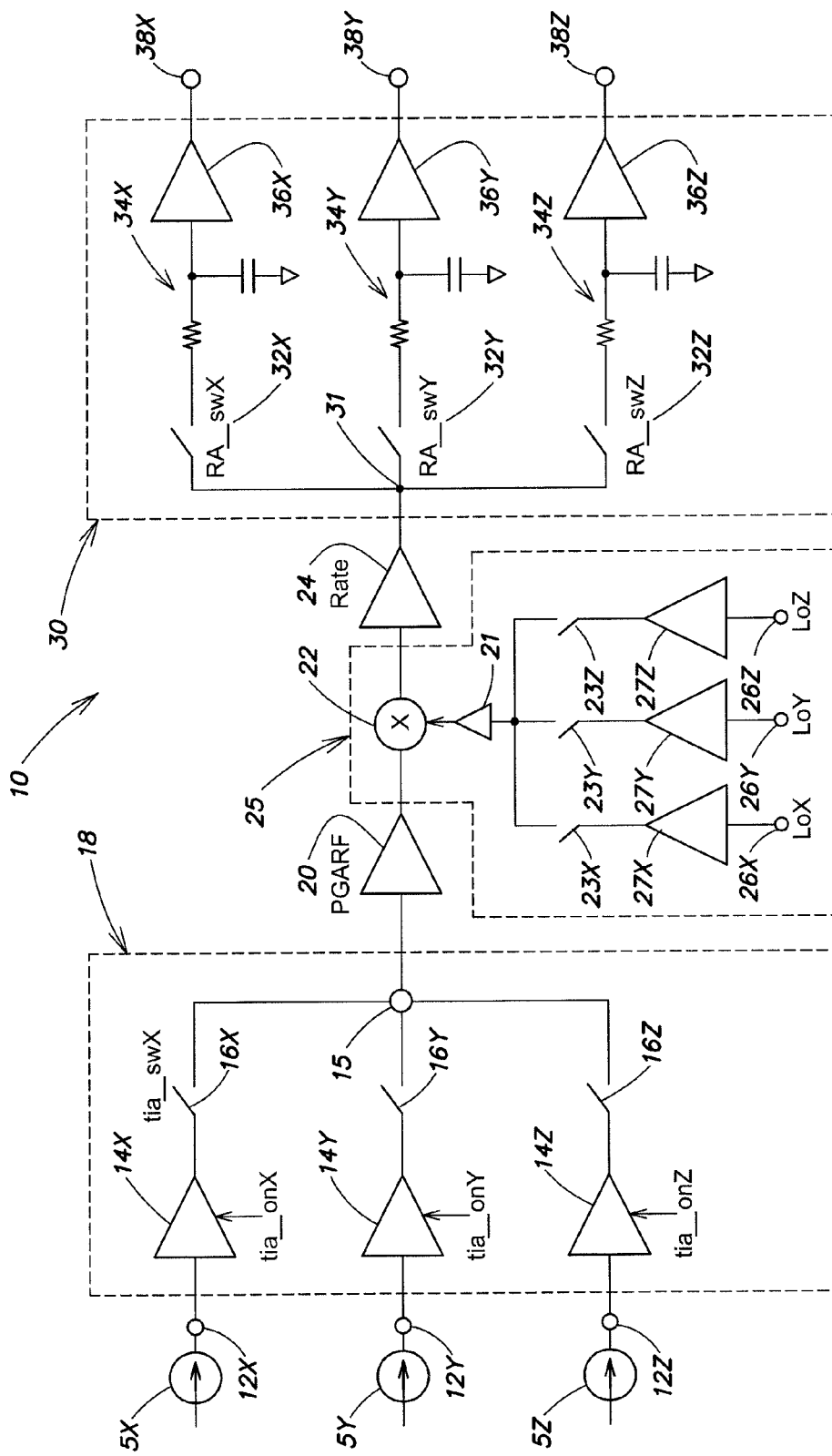
FIG. 1 illustrates a switching architecture for multiple MEMS devices in accordance with the disclosure.

FIG. 1 illustrates a basic architecture for switching in a time-domain multiplexed manner, and, therefore, sharing a common analog signal processing block, referred to as sense channel 10, among three MEMS devices, gyroscopes 5X, 5Y and 5Z. As such, sense channel 10 provides a common signal processing block which is shared in a time-domain multiplexed manner, among the X channel, Y channel and Z channel associated with gyroscopes 5X, 5Y and 5Z, respectively, where each of the respective the X channel, Y channel and Z channel comprise the selectively configurable signal path of sense channel 10 from their respective input node 12 to their respective output node 38, as illustrated in FIG. 1.

In an illustrative embodiment, sense channel 10 comprises, trans-impedance amplifier (TIA) module 18, programmable gain amplifier (PGA) 20, zero-IF mixer (ZIF Mixer) module also, and a rate amplifier (Rate-Amp) 24, and a rate amplifier switch module 30, as explained in greater detail herein.

Trans-impedance amplifier (TIA) module 18 comprises a plurality of trans-impedance amplifier and switch circuit paths, one for each analog input provided to TIA section 18. As illustrated, a trans-impedance amplifier 14X has an input node 12X for receiving the analog signal output of a MEMS device, here gyroscope 5X. TIA 14X includes a second input for receiving a selection signal, TIA_onX. A switch 16X is disposed intermediate the output of TIA 14X and a common output node 15 of TIA module 18 which, in turn, is coupled to the input of programmable gain amplifier (PGA) 20. Similarly, trans-impedance amplifier 14Y has an input node 12Y for receiving the analog signal output of a MEMS device, here gyroscope 5Y. TIA 14Y includes a second input for receiving a selection signal, TIA_onY. A switch 16Y is disposed intermediate the output of TIA 14Y and the output node 15 of TIA module 18. In a similar manner, a trans-impedance amplifier 14Z has an input node 12Z for receiving the analog signal output of a MEMS device, here gyroscope 5Z. TIA 14Z includes a second input for receiving a selection signal, TIA_onZ. A switch 16Z is disposed intermediate the output of TIA 14Z and the output node 15 of TIA module 18.

Whichever selection signal to TIA 14X, 14Y or 14Z is asserted along with closure of its associated switch 16X, 16Y or 16Z, respectively, will determine which of the signal outputs of TIA 14X, 14Y or 14Z will be provided through output node 15 to the input section of programmable gain amplifier (PGA) 20. The output section of programmable gain amplifier 20 is coupled to the input section of zero-IF mixer (ZIF Mixer) module 25.

ZIF Mixer module 25 comprises a demodulator 22 which receives the outputs of programmable gain amplifier 20 and a buffer 21, as illustrated. The input of buffer 21 is coupled through a common node to three internal circuit branches, one for each of the X, Y and Z channels. Each circuit branch comprises in series an input node 26, a buffer 27, and a switch 23, as illustrated. Branch X comprises in series an input node 26X, a buffer 27X, and a switch 23X, as illustrated. Branch Y comprises in series an input node 26Y, a buffer 27Y, and a switch 23Y, as illustrated. Branch Z comprises in series an input node 26Z, a buffer 27Z, and a switch 23Z, as illustrated. The output of demodulator 22 which also functions as the output of zero-IF mixer module 25 is coupled to the input section of rate amplifier 24, as illustrated. Rate amplifier 24 may be implemented with a programmable gain amplifier, similar to PGA 20 herein. The output of rate amplifier 24 is coupled to the input node 31 of rate amplifier switch module 30.

Rate amplifier switch module 30 comprises a common input node 31 coupled to three internal circuit branches, one for each of the X, Y and Z channels. Each circuit branch comprises in series a rate switch 32, filter 34, buffer 36 and output node 38. The X channel branch comprises in series rate switch 32X, filter 34X, buffer 36X and output node 38X, as illustrated. The Y channel comprises in series rate switch 32Y, filter 34Y, buffer 36Y and output node 38Y, as illustrated. Similarly, the Z channel comprises in series rate switch 32Z, filter 34Z, buffer 36Z and output node 38Z as illustrated. Filter 34X, 34Y and 34Z may be implemented with a resistor and capacitor, as illustrated and function as an anti-aliasing filter.

Using the sense channel 10 of FIG. 1, when the gyroscope 5X is being sampled, the corresponding Rate-Amp switch 32X is turned on such that the output samples the X channel through the common sense channel 10. The same applies for the Y and Z channels. Typically in a switching architecture, a set of anti-aliasing filters is required just before the Rate-Amp switches to avoid noise folding. However, this poses a fundamental problem in a multiplexed architecture. For a given switching frequency (Fsw) the bandwidth of anti-aliasing filter needs to be less than Fsw/2, half the switching frequency. However, the minimum bandwidth of the sense channel is needed to be, typically, approximately five times the switching frequency (5 X Fsw) so that the sense channel can settled to the desired value quickly between switching among channels. These two requirements are in conflict.

In the disclosed sense channel 10, the anti-aliasing filters 34 for each of the X, Y, and Z channels are located after their respective rate-amp switches 32, as show in FIG. 1, allowing sense channel 10 to meet both the noise folding and settling requirement. Since the anti-aliasing filters 34 are after the rate-amp switches 32, the sense channel 10 is limited only by it's inherent bandwidth and not the bandwidth of the anti-aliasing filters 34.

It has been demonstrated empirically through simulation and test results that placing the anti-aliasing filter after the switches avoids the folding of wideband noise, provided the bandwidth of the filter (BWfilt) is less than the switching frequency. Finally, the bandwidth of the incoming signal (BWsig) from the gyroscope is typically much lower than the switching frequency and hence does not affect the signal either.

Without limiting the scope of this disclosure, in an illustrative embodiment of the disclosed architecture, typical frequency values may be as follows:
Fsw=22 kHz,
BWfilt=20 kHz
BWsig=500 Hz Sharing a common set of analog blocks among the three X, Y, and Z channels results in reducing the power and area of the sense channel 10 by approximately three times which is a significant advantage over the non-sharing architectures.

Figure 2:
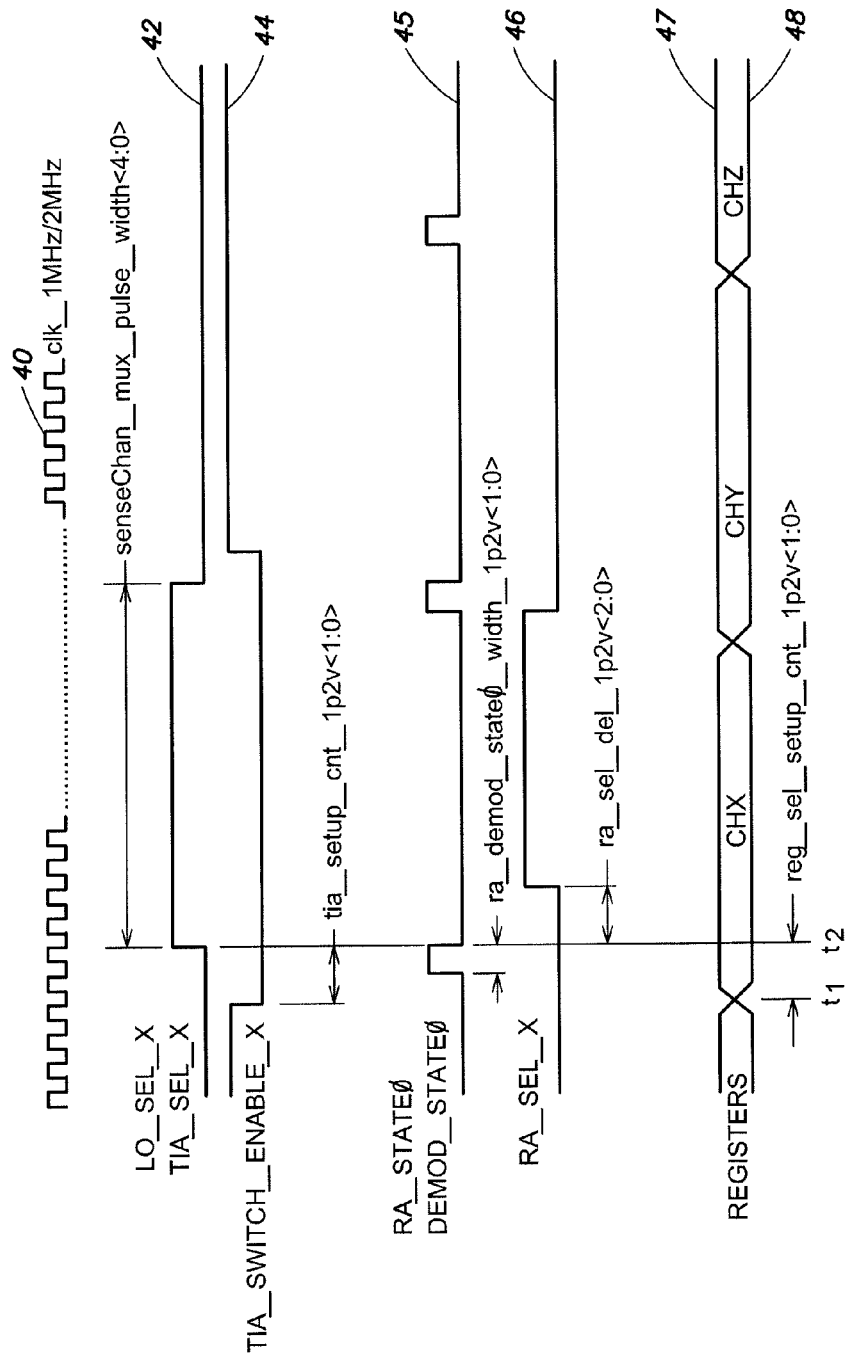
FIG. 2 illustrates a timing diagram of the switching signals for the switching architecture of FIG. 1 in accordance with the disclosure.

FIG. 2 illustrates various signals used to enable the X channel in accordance with the disclosed architecture of FIG. 1. Similar signals with similar relative timing would be us to enable the Y and Z channels. In FIG. 1, signal 40 is a pulse wave signal with a 50% duty cycle which serves as a clock signal to sense channel 10. Signal 42 represents the signal supplied to buffer 27X of LO_SEL_X of ZIF Mixer module 25 and the TIA_SEL_X signal supplied to TIA 14X of trans-impedance amplifier (TIA) module 18 at time t1, as illustrated. Signal 44 represents the TIA_SWITCH_ENABLE_X signal provided to switch 16X and is deasserted at time t2, two clock cycles before signal 42 is asserted. The period in which signal 42 is asserted represents the sense channel multiplexer pulse width. The difference between time t1 and time t2 represents the period for trans-impedance amplifier setup and register selection set up as illustrated by the transitions in register select signals 47 and 48. Signal 45 represents the rate amplifier state zero and demodulate state signals, as illustrated, which are applied to the rate amplifier 24 and demodulator 22, respectively, simultaneously. Signal 46 represents the rate amplifier select signal, as illustrated, and is applied to the rate amplifier 24.

Calibration of Time-Multiplexed Sensors

Figure 3:
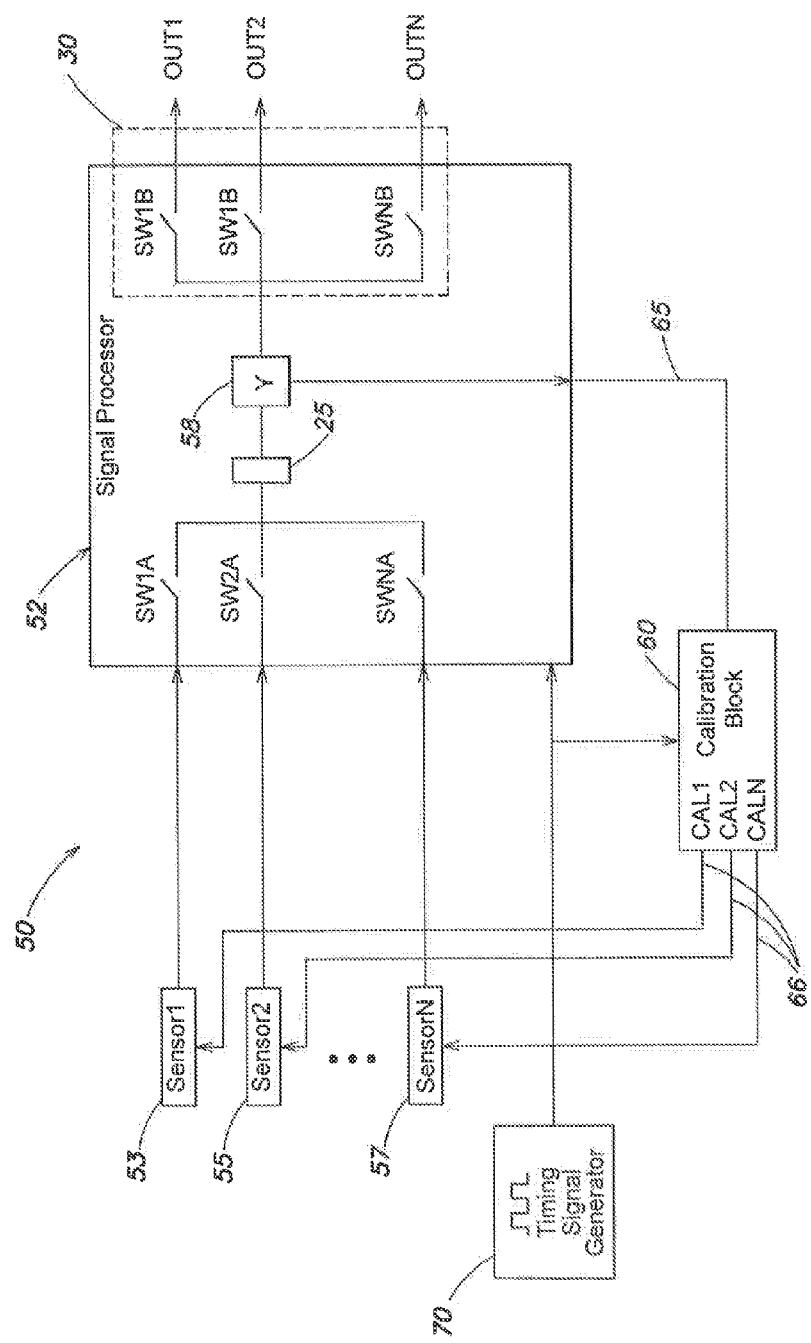
FIG. 3 illustrates a time-multiplexed sensor system in accordance with the disclosure.

According to another aspect of the disclosure, a multiplexed signal processor architecture is capable of performing dynamic calibration of all sensor error signals. FIG. 3 illustrates conceptually a system 50 comprising a common signal processor module 52, calibration module 60, and timing generation module 70. System 50 is operatively coupled to a plurality of sensors 53, 55 and 57 which, in an illustrative embodiment, may be implemented with gyroscopes 5X, 5Y and 5C, respectively. Sensor signal processor module 52 may have substantially the same construction and function as sense channel 10, for processing sensor output signals with a common set of components in a multiplexed manner, as described elsewhere herein, with the addition of a signal processing module 58 coupled intermediate intermediate trans-impedance rate amplifier switch module 30 and mixer module 25. In one embodiment, sensors 53, 55 and 57 interface with signal processor module 52 through a plurality of input switches SW1A, SW2A, and SWNA, as illustrated in FIG. 3, instead of the transimpedance amplifiers of module 18 of sense channel 10. Instead, any transimpedance amplifier(s) may be located within mixer module 25.

Exact composition and function of signal processing module 58 may vary according to the nature of the sensors and their respective output signals coupled to trans-impedance module 18. For example, in one embodiment, where sensors 53, 55 and 57 are implemented with gyroscopes, signal processing module 58 may comprise one or more components utilize to process the raw output signal from the sensor into a more optimized format for presentation at the output of module 30, as well as a signal derivative from the sensor output signal and representing one or more parameter characteristics of the sensor which may be utilized to generate a calibration signal for the sensor, as explained herein.

In one embodiment, signal processing module 58 may comprise one or more elements for conditioning the sensor signal including, but not limited to, components for performing any of demodulation, filtering, amplifying or voltage offset, etc. of the sensor output, such components being interconnected and configured either serially or in parallel, as necessary, depending upon the exact signal conditioning required by the sensor and the nature of the signal derived there from to be used as a calibration signal. In one illustrative, module 58 may comprise a circuit that can detect gyroscope quadrature errors, e.g. an analog signal processing block that utilizes a demodulator circuit to output a quadrature level signal as parameter signal 65. An example of a circuit to detect gyroscope quadrature errors utilizing a demodulator can be found in U.S. application Ser. No. 14/321,028, filed Jul. 1, 2014, by Ronald J. Lipka et al., entitled METHOD AND APPARATUS FOR DETECTING AND CORRECTING QUADRATURE ERROR SIGNALS FROM A MEMS GYROSCOPE, the entire subject matter of which is incorporated herein by this reference for all purposes. Other implementations of module 58 may comprise circuits that can detect gyroscope mechanical mode mismatch errors.

Those skilled in the relevant arts will understand that such signal conditioning may vary according to the discretion of the circuit designer. The output of signal processing module 58 is provided to rate amplifier switch module 30. In addition, signal processing module 58 generates a parameter signal 65 which is derived at least partially from the sensor output signal and which is provided to calibration module 60, as indicative of a component of the sensor output attributable to specific sensor parameter.

Calibration module 60 receives parameter signal 65 and generates a calibration signal therefrom which is provided in a multiplexed manner to the appropriate sensor is which active within the sense channel 10. Upon receipt by module 60, the parameter signal 65 undergoes analog-to-digital conversion, if received in analog format, in a manner understood by those skilled in the arts. From the digitized parameter signal two state variables, STATE_VAR1 and STATE_VAR2 are generated.

Module 60 further comprises one or more temporary latches an appropriate components for logically manipulating the values of the STATE_VAR1 and STATE_VAR2. In one embodiment, calibration module 60, may further comprise a PID controller which analyzes the digitized parameter signal 65 in the digital domain and generates calibration signal 66. The PID controller uses the digitized samples of the parameter signal 65 to calculate any of the proportional (P), integral (I), and derivative (D) components of the parameter signal. To that extent, PID controller may contain enough onboard memory or has access to memory capable of storing at least one prior digital sample representing a previously sampled value of parameter signal 65. The P, I, and D signals may be scaled by individual weighting factors to affect the feedback loop accuracy, settling time, and stability, or possibly any other parameters, as needed, based on the exact implementation of the system 50.

Figure 5:
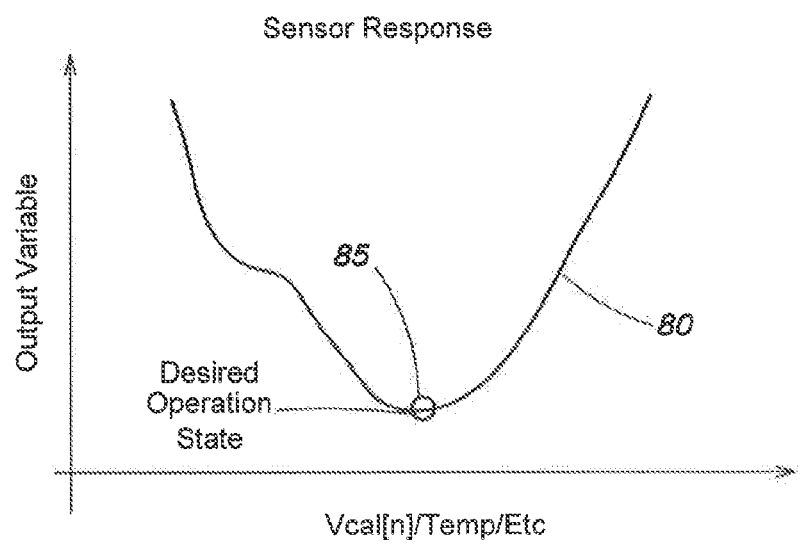
FIG. 5 illustrates a conceptually a graph of the response curve of a parameter of a sensor with which the disclosed calibration technique may be utilized in accordance with the disclosure.

Such calibration signal calculations may be formed, for example, with STATE_VAR1 representing the slope of the response curve, illustrated in FIG. 5, and is calculated using a previously stored value of the parameter signal 65, i.e. the output response of a previously applied calibration control, and the present value of primer signal 65, i.e. the output response of a presently applied calibration control. STATE_VAR2 is the sign of the slope of the response curve 80, as illustrated in FIG. 5, except if the slope is zero, then STATE_VAR2 retains the previous sign of the slope. The primary purpose of STATE_VAR2 is to enable the process to get out of local flatness in the response curve as shown in FIG. 5. Following generation of the calibration signal 66 the calibration signal is provided to its respective corresponding sensor as illustrated in FIG. 3 in time multiplexed manner. In one embodiment, both the generated calibration signal 66 and the parameter signal 65 are finite resolution digital words.

In one embodiment, calibration module 60 is implemented as a sampled digital system where the sample period is decided by the timing generator 70, as described with reference to FIGS. 3-4. The calibration signal 66 is updated during the phase when that particular sensors output is inactive. This allows the sensor output to respond to the change in calibration control before it is applied to the output so as not to disturb the sensor reading. The calibration signal 66 update technique is based on the value of STATE_VAR2. If the value is negative, the calibration signal 65 is incremented, else it is decremented, allowing the sensor to remain in the desired minima state.

Figure 4:
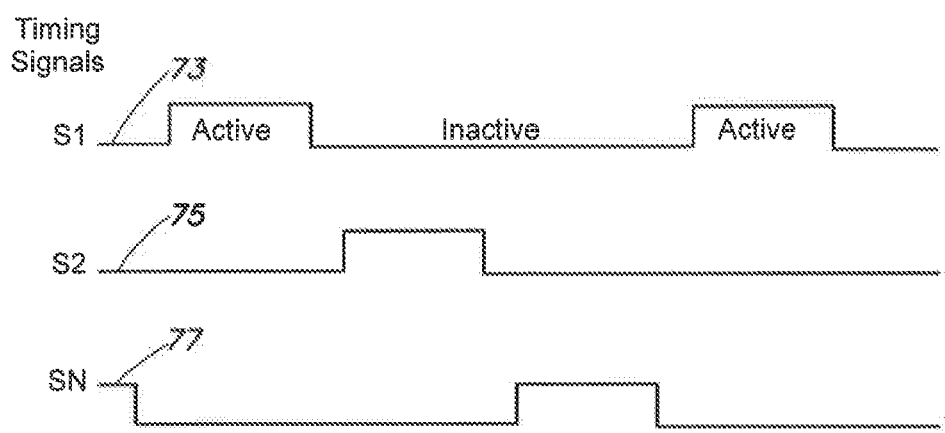
FIG. 4 illustrates a timing diagram of the time-multiplexed architecture of FIG. 3 in accordance with the disclosure.

FIG. 4 illustrates a timing diagram of the time-multiplexed architecture of FIG. 3. Timing signals 73, 75 and 77 control whether sensors 53, 55 and 57, respectively, are active within the sense channel 10. As will be understood by those skilled in the arts, the number of timing signals will depend on the number of sensors within the overall system 50. The exact implementation of timing signal generator 70 will vary depending on the number of sensors present within system 50, as would be understood by those reasonably skilled in the art.

FIG. 5 illustrates graphically the response curve of a parameter of a sensor for which the disclosed calibration technique is utilized. The response of such a sensor system follows a similar trajectory for environmental effects (temperature, stress, etc) as well as the calibration signal, e.g. Vcal[n] in FIG. 5. In FIG. 5, the transfer function illustrated representing the sensor response curve 80 has a minima 85 which is the desired operating state of the sensor. In the graph of FIG. 5, the parameter measured on the y-axis may typically be measured in volts while the parameter on the x-axis is the voltage of the calibration signal of the sensor relative to the parameter at issue.

Note that the curve of FIG. 5 illustrates just one example of a sensor parameter response curve; other curves are possible, i.e. linear instead of a parabola, with a specified target output voltage instead of the minimum of the parabola, or a parabola that has multiple minimas and a local minima within some specific range is the target. In one embodiment, each separate sensor could have unique curves. Since the disclosed system 50 is time multiplexed, each sensor can be uniquely calibrated using the techniques described herein.

It will be obvious to those reasonably skilled in the art that modifications to the apparatus and process disclosed here in may occur, including substitution of various component values or nodes of connection, signals or signal timing without parting from the true spirit and scope of the disclosure. For example, the circuit described herein may be implemented on an ASIC or formed with discrete components or any combination thereof to realize the system disclosed herein. In addition, any type of semiconductor fabrication technology may be used to implement the switching architecture disclosed herein.

What is claimed is:
1. A sense channel apparatus comprising:
a) a plurality of input switches for receiving analog signals from a plurality of MEMS devices, respectively;
b) a plurality of output switches;
c) a zero-IF mixer operatively coupled intermediate the plurality of input switches and the plurality of output switches;
d) a common signal processing module operatively coupled intermediate the zero-IF mixer and the plurality of output switches, the signal processing module configured to at least partially derive a parameter signal from an analog signal from one of the plurality of MEMS devices; and e) a calibration module configured to generate a calibration signal at least partially derived from the parameter signal associated with one of the plurality of MEMS devices and further configured to provide the generated calibration signal to one of the plurality of MEMS devices in a multiplexed, time domain manner, wherein calibration signals are generated for the plurality of MEMS devices, respectively.

2. The apparatus of claim 1, wherein the zero-IF mixer has a trans-impedance amplifier.

3. The apparatus of claim 2 wherein at least one of the MEMS devices comprises a gyroscope.

4. The apparatus of claim 1 further comprising a timing generator module for providing timing signals to the signal processing module and the calibration module.

5. The apparatus of claim 1, wherein the calibration signal is updated to a particular MEMS device of the plurality of the MEMS devices during a phase when an output of the particular MEMS device is inactive.

* * * * *